United States Patent
Dakshinkar et al.

(10) Patent No.: US 12,096,279 B2
(45) Date of Patent: *Sep. 17, 2024

(54) DYNAMIC BSS COLOR FEATURE FOR CO-HOSTED VIRTUAL ACCESS POINTS

(71) Applicant: Hewlett Packard Enterprise Development LP, Spring, TX (US)

(72) Inventors: Abhiruchi Dakshinkar, San Jose, CA (US); Eldad Perahia, San Jose, CA (US); Mohd Shahnawaz Siraj, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,016

(22) Filed: Jan. 6, 2023

(65) Prior Publication Data

US 2023/0147820 A1 May 11, 2023

Related U.S. Application Data

(63) Continuation of application No. 16/875,326, filed on May 15, 2020, now Pat. No. 11,570,663.

(51) Int. Cl.
*H04W 28/18* (2009.01)
*H04W 72/0446* (2023.01)
*H04W 74/0816* (2024.01)
*H04W 88/08* (2009.01)
*H04W 88/10* (2009.01)

(52) U.S. Cl.
CPC ....... *H04W 28/18* (2013.01); *H04W 72/0446* (2013.01); *H04W 74/0816* (2013.01); *H04W 88/08* (2013.01); *H04W 88/10* (2013.01)

(58) Field of Classification Search
CPC ............ H04W 28/18; H04W 72/0446; H04W 74/0816; H04W 88/08; H04W 88/10
See application file for complete search history.

(56) References Cited

U.S. PATENT DOCUMENTS

| | | | | |
|---|---|---|---|---|
| 10,524,290 | B1* | 12/2019 | Chu | H04B 17/318 |
| 10,863,545 | B2* | 12/2020 | Kim | H04W 48/16 |
| 11,570,663 | B2* | 1/2023 | Dakshinkar | H04W 88/08 |
| 2019/0082387 | A1* | 3/2019 | Kim | H04W 52/0216 |
| 2019/0174577 | A1* | 6/2019 | Patil | H04W 76/11 |
| 2019/0357256 | A1* | 11/2019 | Kim | H04W 72/0446 |
| 2021/0360479 | A1* | 11/2021 | Dakshinkar | H04W 88/10 |
| 2023/0147820 | A1* | 5/2023 | Dakshinkar, III | H04W 16/10 370/329 |

* cited by examiner

*Primary Examiner* — Raj Jain
(74) *Attorney, Agent, or Firm* — Hewlett Packard Enterprise Patent Department

(57) ABSTRACT

A dynamic BSS color feature for co-hosted virtual access points is described. An example of a storage medium includes instructions to operations including enabling, by an access point, a dynamic basic service set (BSS) color feature for operation with multiple virtual access points (VAPs) hosted by the access point; switching a parameter of the access point to indicate that no co-hosted BSS is present; assigning a different BSS color to each of the VAPs; performing access point operations, including utilizing the assigned BSS colors for transmissions relating to any of the VAPs; and disabling the dynamic BSS color feature upon occurrence of one or more conditions.

14 Claims, 7 Drawing Sheets

DYNAMIC BSS COLOR FEATURE FOR CO-HOSTED VIRTUAL ACCESS POINTS

CROSS REFERENCE TO RELATED APPLICATIONS

This application is a continuation of, and claims the priority benefit of U.S. patent application Ser. No. 16/875,326, filed on May 15, 2020, issued as U.S. Pat. No. 11,570,663 on Jan. 31, 2023, the contents of which are incorporated herein by reference in their entirety.

BACKGROUND

As wireless devices continue to increase in number, the operation of client devices and access points in wireless local access networks (WLAN) are often in close proximity with other WLANs. For this reason, client devices often receive data packets that are not intended for such devices, but rather are related to a different basic service set (BSS).

To reduce the processing required for devices when receiving data packets to discern whether the data packets are relevant, IEEE 802.11ax provides for BSS color coding to assist a station in identifying the BSS from which a packet originates. In this manner, a client device is able to quickly determine whether a received packet belongs to a different BSS and thus can be disregarded.

However, 802.11ax directs that all BSSs in a co-hosted BSS set utilize the same color. With multiple virtual APs (VAPs) in a co-hosted BSSID thus advertising the same color, this can result in the reporting of BSS color collisions by client devices when receiving packets having a same BSS color without any matching addresses because the packets relate to different VAPs that are co-hosted by the same AP. Further, the processing of the intra-BSS packets can interfere with the power savings for a station in dozing until the end of a non-relevant packet because the station cannot quickly identify which packets are associated with different VAPs.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
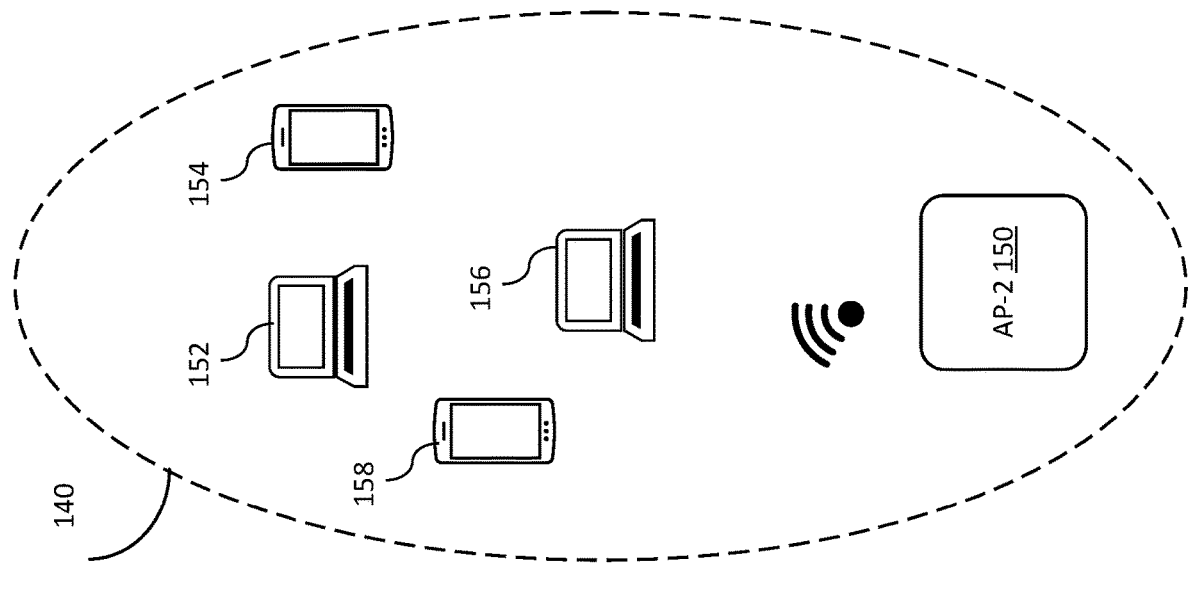
FIG. 1 is an illustration of operation of a dynamic BSS color feature in an environment, according to some embodiments.
Figure 1:
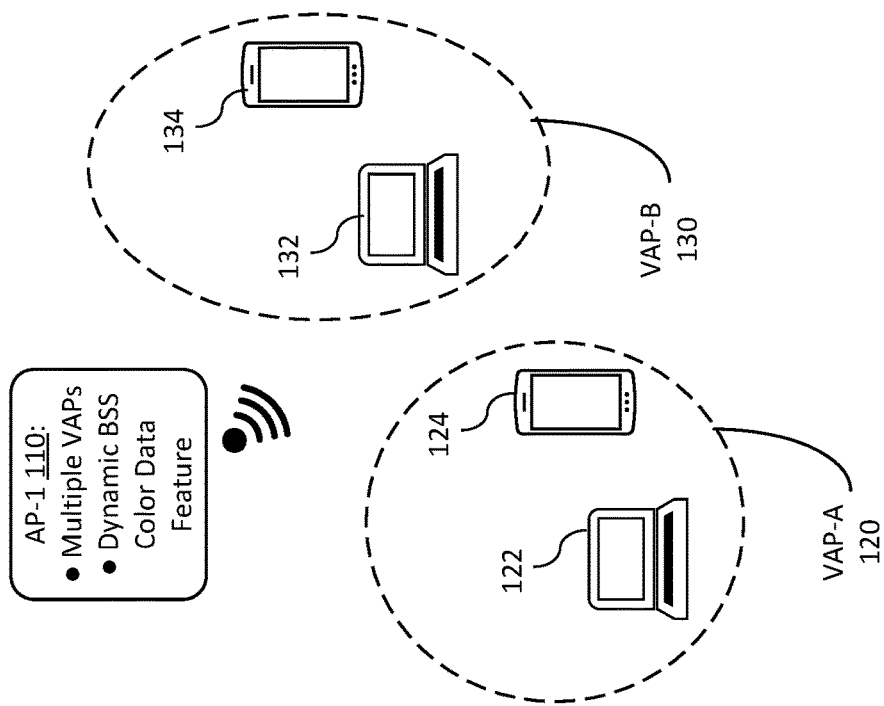

Embodiments described herein are directed to a dynamic BSS color feature for co-hosted virtual access points.

The IEEE (Institute of Electrical and Electronic Engineers) 802.11 physical (PHY) layer is divided into two sublayers, these layers being the PLCP (Physical Layer Convergence Procedure) sublayer and the PMD (Physical Medium Dependent) sublayer. The PLCP operates to prepare the frame for transmission by taking the frame from the MAC sublayer and creating the PLCP Protocol Data Unit (PPDU). (A PPDU may also be referred to herein as a packet or a PPDU packet.) The PMD sublayer then modulates and transmits the data as bits.

Upon an access point (AP) transmitting a PPDU, a non-AP high efficiency station (HE STA), such as a client device, may receive the PPDU. The station then is required determine whether the PPDU regards the basic service set (BSS) to which the station belongs, wherein an access point and its associated stations (such as client devices) comprise a BSS.

To prevent the station from being required to decode a PPDU that relates to another BSS, BSS color is used to assist the station to quickly identify the BSS from which a PPDU originates. Each BSS utilizes a different unique BSS color, wherein the BSS color is a 6-bit code within the signal preamble or SIG field. The use of BSS color assists in coexistence of overlapping BSSs (OBSS) and to allow spatial reuse within one channel. A station that is assigned a same BSS color as a received packet uses a lower received signal strength (RSSI) threshold for deferral, which reduces collisions on the same BSS. A station that is assigned a different BSS color as a received packet use higher RSSI threshold for deferral, which allows use of more simultaneous transmissions.

BSS color is primarily used to identify a inter-BSS PPDU, a PPDU belonging to different AP. However, BSS color is also a prerequisite for the spatial reuse (SR) feature, wherein multiple stations that are part of different BSSs operating on the same channel can transmit simultaneously under conducive conditions. Spatial reuse may be categorized as OBSS PD-based spatial reuse (where PD refers to preamble detection) and PSR-based spatial reuse (where PSR refers to parameterized spatial reuse). OBSS PD-based spatial reuse may include two types of operations:

(a) Operation with non-SRG (Spatial Reuse Group) OBSS PD level; or (b) Operation with SRG OBSS PD level.

In either of these types of operation minimum and maximum preamble detection levels (min_OBSS_PD_level and max_OBSS_PD_level) are defined. A STA chooses an OBSS_PD_LEVEL such that min_OBSS_PD_level<OBSS_PD_level<max_OBSS_PD_level. If an 802.11 packet is received from another BSS, the following criterion is applied based on the measured RSSI (Received Signal Strength Indication):

$$RSSI \leq OBSS\_PD\_level \quad [1]$$

If the RSSI level meets the RSSI criterion provided in Equation [1], the peer device receiving the packet can still transmit (i.e., stomp) over the detected signal and thus can initiate a transmission. For non-SRG operation, this stomping may be performed upon PPDUs satisfying the RSSI criterion from any inter-BSS PPDU. For SRG operation, this stomping may only be performed on PPDUs from inter-BSS PPDUs that satisfy the RSSI criterion, and that originate from a set of BSSs referred to as a Spatial Reuse Group (SRG). An SRG may have up to 64 members.

PSR-based spatial reuse is "parameterized" spatial reuse is which allowance of the PPDU stomping by an AP is a function of transmit power of the PPDU being transmitted by the BSS and the receive power level of the inter-BSS PPDU that is stomped upon.

However, an AP may host multiple virtual access points (VAPs). IEEE 802.11ax directs that all BSSs in a co-hosted BSS utilize the same BSS color. With multiple VAPs in a co-hosted BSSID thus advertising the same color, this can result in extra processing at the client before deciding not to report the BSS color collisions for transmission from different VAPs of the same AP the STA is connected with. Further, this interferes with the power save for a station in dozing until the end of a non-relevant PPDU. The power save is reduced for a station when each VAP utilizes the same color as some or all intra-BSS PPDUs need to be processed longer by a receiving station before concluding that the PPDUs are non-relevant.

In some embodiments, an apparatus, system, or process provides a dynamic BSS color feature or operation for assigning different colors to each VAP as a co-hosted BSS. In such operation, each VAP is to indicate operation as a non-co-hosted BSS, thus allowing for intra-BSS PPDU power save for receiving stations as different colors are detected, and avoiding reporting of intra-BSS color collisions to the AP by receiving stations.

In this manner, an apparatus, system, or process can provide the following benefits:
(1) STAs are provided an improved mechanism to avoid reporting the BSS color collision for packets from other VAPS in the same co-hosted BSSID. With the usage of different BSS colors for each VAP, a STA is able to arrive at a decision that a color collision need not be reported with reduced packet processing, and this thus results in power savings at the STA. With different BSS colors being assigned for each VAP, only the PHY header needs be processed to check for the BSS_COLOR field. In contrast, with the same color being assigned for all the VAPs, the MAC header needs to be processed in addition to the PHY header. To process the MAC header, the STA trans-receiver is ON for an additional period of time, resulting in added power consumption at the STA.
(2) Improved intra-BSS PPDU power save is provided. Because the MAC header processing may be avoided to detect the non-relevant intra-BSS PPDU, a STA enters doze state when it detects the non-relevant PPDU. Reduced packet processing results in improved power save at the STA.

In some embodiments, the apparatus, system, or process is to enable or disable the BSS color feature based on, for example, the configuration of the network and the spatial reuse strategy in use to optimize usage of the available spectrum. More specifically, the apparatus, system, or process may operate to enable or disable the BSS color feature based on one or more of the SRG threshold (i.e., 64 under the current standard) number of BSS colors to maintain the spatial reuse operation, or a BSS color collision count to avoid excessive BSS color collisions.

As used herein, access point (AP) (also referred to as a wireless access point (WAP)) refers to a networking hardware device that allows wireless devices to connect to a network, including connection to the Internet or an intranet. The AP may connect to a router (via a wired network) as a standalone device, or may be an integral component of the router itself. An AP may include, but is not limited to, communication using any IEEE 802.11 Wi-Fi standards.

FIG. 1 is an illustration of operation of a dynamic BSS color feature in an environment, according to some embodiments. As illustrated in FIG. 1, an environment may include any number of access points and stations (such as client devices) that are served by the access points in overlapping BSSs. A first access point (AP-1) 110 provides services for client devices 122, 124, 132, and 134. Some distance away may be an overlapping BSS (OBSS) 140 including second access point (AP-2) 150 with client devices 152, 154, 156, and 158.

In spatial reuse operation, the AP-1 110 and AP-2 140 may be utilizing a same channel, with the AP-1 being assigned a first BSS color and AP-2 140 being assigned a second BSS color. In such operation, a particular client device, such as device 134, may detect a PPDU for OBSS 140 on the common channel. If this occurs, device 134 will detect the different color for OBSS 140, and will determine that PPDU is not relevant to the device and can be ignored. This may allow device 134 to proceed to a lower power state for the duration of the PPDU.

However, as illustrated in FIG. 1, AP-1 110 may host multiple VAPs, such as VAP-A 120 including client devices 122 and 124, VAP-B including client devices 132 and 134, and other non-illustrated VAPs. IEEE 802.11ax would normally provide that the VAPs all utilize the same color as co-hosted VAPs. In this instance, the VAPs will also receive PPDUs from other VAPs of AP-1 110. For example, device 134 may in VAP-B 130 may receive a PPDU for VAP-A 120. In this instance, the client device is required to evaluate the PPDU to determine whether the PPDU is relevant to VAP-B because the color indicated in the PPDU will be the same for each VAP co-hosted by the AP-1.

Figure 3:
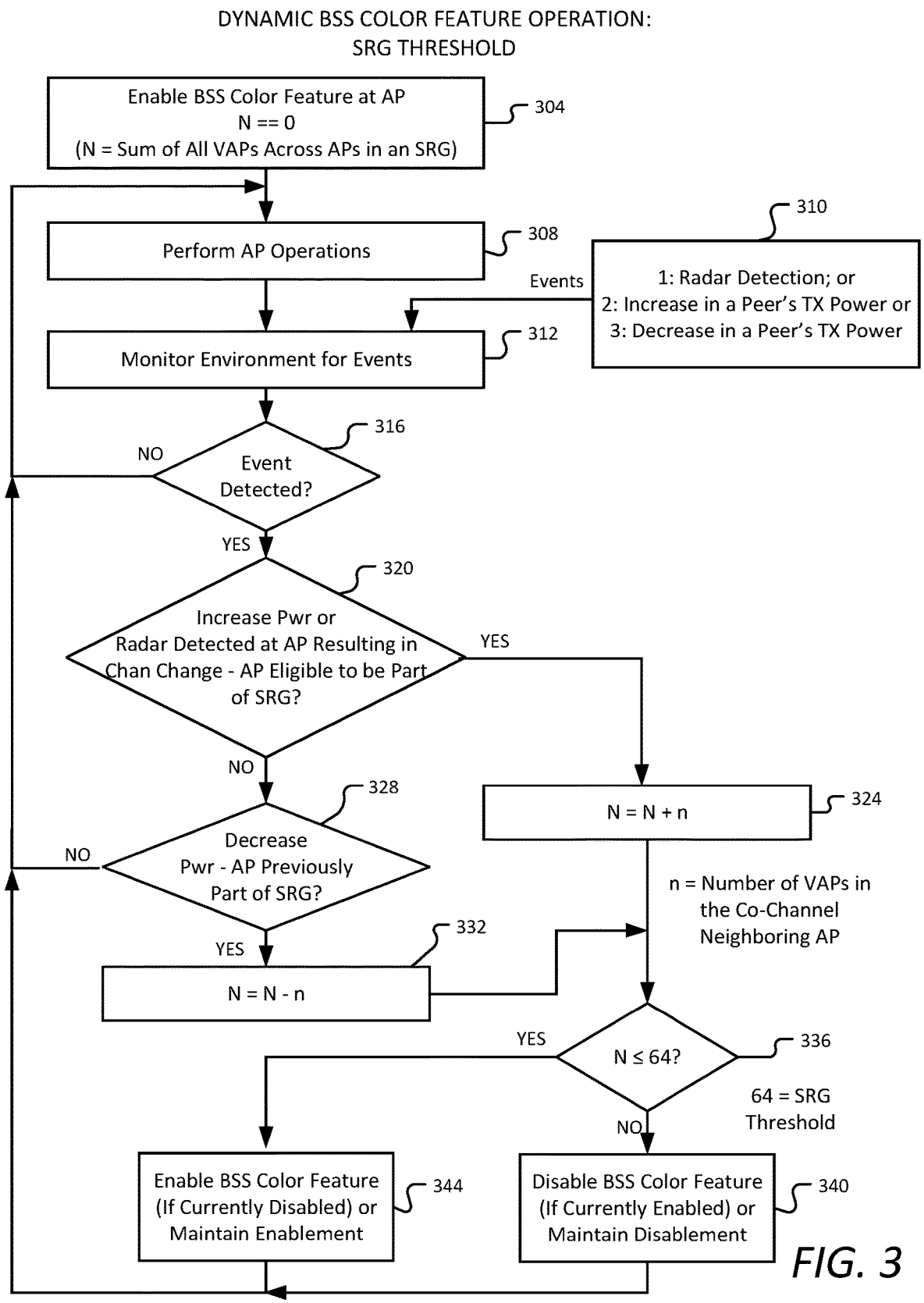
FIG. 3 is a flow chart to illustrate a process for enablement or disablement of a dynamic BSS color feature based at least in part on an SRG threshold, according to some embodiments.
Figure 4:
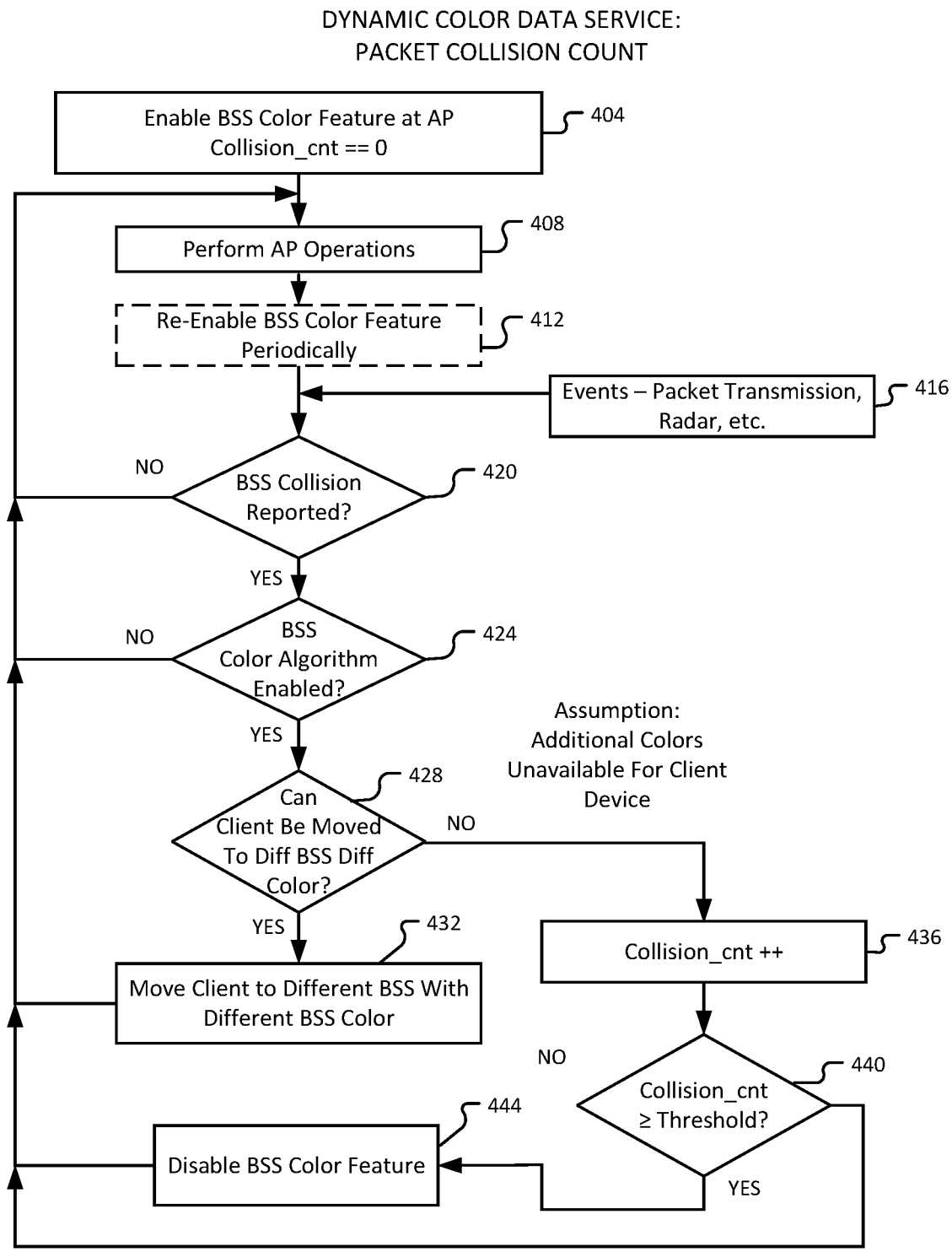
FIG. 4 is a flow chart to illustrate a process for enablement or disablement of a dynamic BSS color feature based at least in part on BSS color collisions, according to some embodiments.

In some embodiments, AP-1 110 provides a dynamic BSS color feature that allows for establishing a different color for each of the VAPs that are co-hosted by AP-1. In some embodiments, AP-1 is to enable the feature for operation, and is to disable the feature, thus transitioning to a single color for VAP-A 120 and VAP-B 130, when certain conditions are detected. The conditions may include, for example, detection of a number of VAPs in a particular SRG exceeding a threshold value, or detection of a number of BSS color collisions exceeding a threshold value. Further details regarding the operation of an access point in providing a BSS color feature may be as illustrated in FIGS. 3 and 4.

Figure 2:
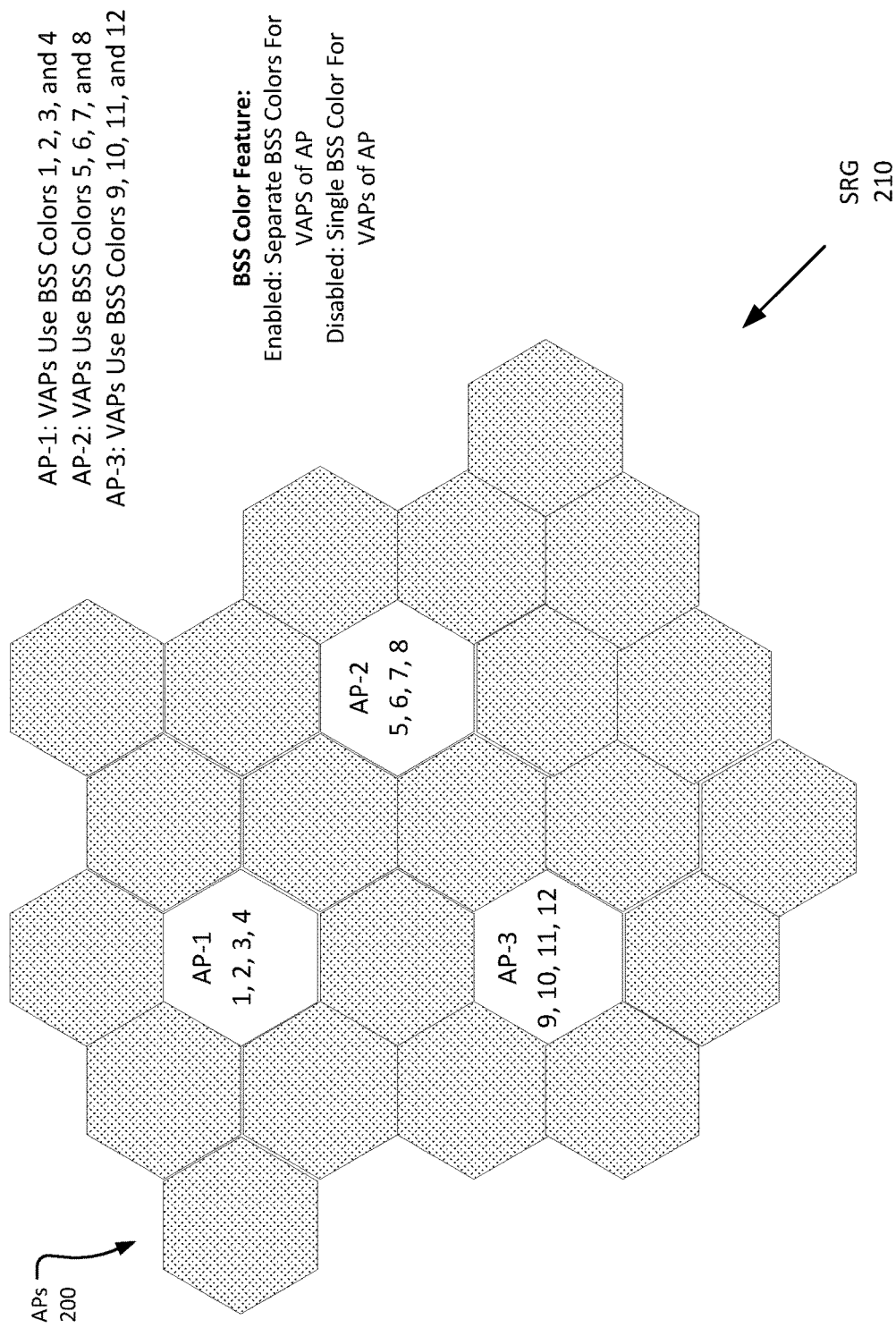
FIG. 2 is an illustration of BSS color for co-hosted VAPs, according to some embodiments.

FIG. 2 is an illustration of BSS color for co-hosted VAPs, according to some embodiments. As shown in FIG. 2, each access point 200 may utilize a different BSS color, which may be utilized to improve efficiency and reduce power consumption in detection of inter-BSS packets, and to support spatial reuse in transmission spectrum.

Illustrated in FIG. 2 are access points AP-1, AP-2, and AP-3 that each include multiple VAPs. In conventional operation, 802.11ax directs that the VAPs of each access point utilize the same BSS color as co-hosted VAPs. However, the environment may allow for enablement of a dynamic BSS color feature that implements a different color for each of the VAPs of an access point, thereby reducing reporting of BSS color collisions for inter-VAP transmission. In the illustrated example, the VAPs of AP-1 use BSS colors 1, 2, 3, and 4, the VAPs of AP-2 use BSS colors 5, 6, 7, and 8, and the VAPs of AP-3 use BSS colors 9, 10, 11, and 12.

In some embodiments, the dynamic BSS color feature may be enabled or disabled based on current conditions, such as the configuration of the network and the spatial reuse strategy in use to optimize usage of the available spectrum. As illustrated in FIGS. 2, AP-1, AP-2, and AP-3 may be within a spatial reuse group (SRG) 210 having a maximum threshold of 64 colors, and the BSS color feature may be disabled upon exceeding the threshold number of BSS colors in the SRG, as illustrated in FIG. 3. Further, the BSS color feature may be disabled upon a collision count for color collision exceeding a certain threshold, as illustrated in FIG. 4.

FIG. 3 is a flow chart to illustrate a process for enablement or disablement of a dynamic BSS color feature based at least in part on an SRG threshold, according to some embodiments. As illustrated in FIG. 3, a dynamic BSS color feature may be enabled at an AP, with a value N being set to zero, N equaling the sum of all VAPs across APs in a particular SRG 304. The AP is to perform AP operations 308, including providing services for client devices within a BSS, and to monitor the environment through reception of signals for events 312, wherein the events may include radar detection, an increase in a peer's transmission power, or a decrease in a peer's transmission power 310.

In no event is detected 316, the process continues with the AP performing AP operations 308 and monitoring the environment for events 312. Upon an event being detected 316, a determination is made whether the detected event is related to an increase in power of an AP or related to radar being detected by an AP that results in a change in channel, and the AP is eligible to be part of the SRG 320. If so, then the N value is increased by n, n being the number of VAPs in the co-channel neighboring AP 324. In some embodiments, there is a determination whether the N value is then less than or equal to 64 (the maximum number for the SRG) 336. If N is greater than 64, the BSS color feature is to be disabled (if currently enabled) or disablement is maintained 340 because the number of VAPs requiring different colors is greater than the threshold number for the SRG. If N is less than or equal to 64, then the BSS color feature is to be enabled (if currently disabled) or enablement of the BSS color feature is maintained 344 because the number of VAPs requiring different colors is still within threshold number for the SRG. The process then returns to performing AP operations 308 and monitoring the environment for events 312.

If a determination is made that the detected event is not related to an increase in power or radar detection of an AP that is eligible to be part of the SRG 320, a determination may be made whether the detected event is related to an decrease in power of an AP that was previously part of the SRG 328. If not, the process can return to performing AP operations 308 and monitoring the environment for events 312 as the event is an event that does not affect the number of VAPs within the SRG. If the detected event is related to a decrease in power of an AP that was previously part of the SRG, then the N value is decreased by the n number of VAPs of the AP 332, and the process may proceed with the determination whether the N value is less than the 64 threshold to determine whether the BSS color feature is be enabled 344 or disabled 340.

FIG. 4 is a flow chart to illustrate a process for enablement or disablement of a dynamic BSS color feature based at least in part on BSS color collisions, according to some embodiments. In some embodiments, an algorithm is to enable or disable a dynamic BSS color feature of an based on color collision detection by client devices.

With a reduced number of BSS colors remaining due to the different colors that are assigned to VAPs under the BSS color feature, co-channel APs will exhaust available colors at a faster rate. The operation further depends on the bandwidth of operation and band that is utilized. For example, 2G operation will have fewer channels than 5G if APs are operating in 20 MHz, but channels available with 5G, 80 Mhz will be less than channels with 5G, 20 Mhz.

For a particular reference AP, if a BSS color collision is reported by a station, such as a client device reporting reception of a packet with a same color but different address than an address for the VAP to which the client device belongs, a check is made to determine if the client device can be moved to another BSS, where the client device may no longer see any collisions (e.g., if the client device was previously at a border with an OBSS that was the source of the received packets). If a move to another BSS is not possible, a count of detected collisions is increased. Once this count crosses a certain threshold, the BSS color feature is disabled. Periodically, such as every 24 hours, or upon the occurrence of another event, the AP may re-enable the BSS color feature and determine if the balance may be maintained.

It is noted that the above process assumes that all of the possible BSS colors are being utilized by APs in a network, and thus a different color is not available for a VAP. If certain colors are free, then the reference AP may alternatively select a color from the remaining colors for a VAP to address the BSS color collisions detected by a client device.

As the process is illustrated in FIG. 4, a dynamic BSS color algorithm may be enabled at an AP with a value Collision_cnt being set to zero 404, wherein the Collision-_cnt value represents a number of BSS color collisions detected for a BSS. The AP then performs AP operations 408, which may include operations serving client devices that are within the BSS to which the AP belongs. In some embodiments, the process may include re-enabling the BSS color feature if previously disabled (as described below) when appropriate, such as, for example, reenabling the feature periodically (every 24 hours, or another time period).

In operation, multiple events may occur in the environment, including packet transmissions, radar signals, and other signal events 416. The AP may monitor for reports of BSS color collisions 420. If a BSS color collision is reported 420 and the BSS color algorithm is not enabled 424, the process may continue with AP operations 408, which may include conventional handling of BSS color collision reports. If the BSS color algorithm is enabled 424, then a determination is made whether the reporting client device can be moved to a different BSS with a different BSS color 428, which could avoid detection of further BSS color collisions by the client device. If so, the client device is moved to a different BSS with a different BSS color 432, and the process may continue with the general performance of AP operations 408.

If the client device cannot be moved to a different BSS with a different color 428, then the Collision-cnt value is incremented 436, and there is determination whether the Collision-cnt value is greater than or equal to a collision count threshold 440. If not, then the process may continue with AP operations 408. If the Collision-cnt value is greater than or equal to the collision count threshold 440, then the BSS color feature is disabled 444. Disabling of the BSS color feature results in all VAPs hosted by the AP being required to utilize a same BSS color. The use of a single BSS color has the disadvantage of reducing opportunity for intra-PPDU power save by client devices, but may eliminate or reduce the BSS color collision issue for the current network conditions.

In some embodiments, the collision count threshold, the periodic time period for re-enabling the BSS color feature, or both may be set prior to the AP operation to optimize AP operation, or may be modified dynamically by the AP based on one or more factors as the network environment changes.

Figure 5:
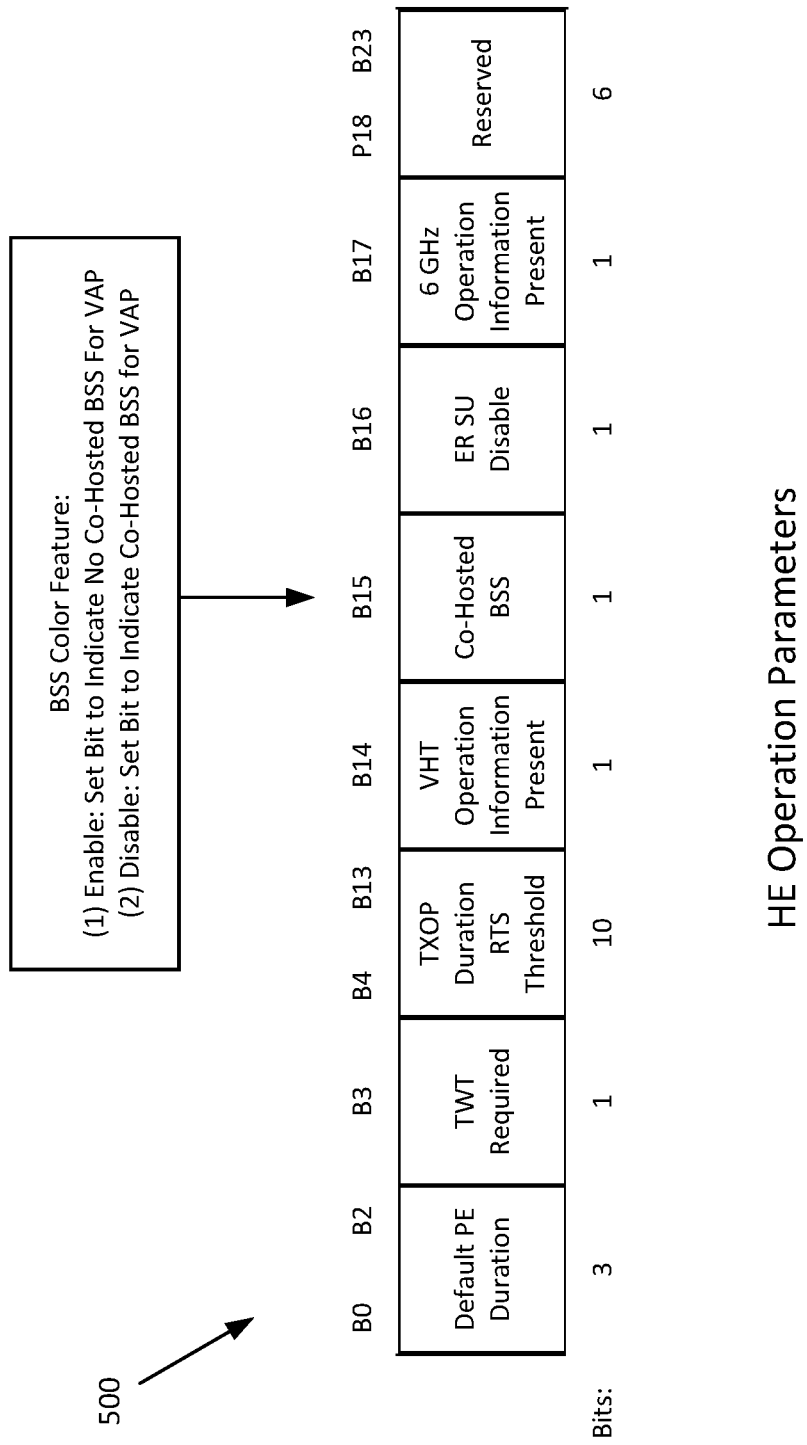
FIG. 5 is an illustration of switching of parameters for a dynamic BSS color feature, according to some embodiments.

FIG. 5 is an illustration of switching of parameters for a dynamic BSS color feature, according to some embodiments. As further described above, an access point in conventional operation utilizes a single BSS color for each of multiple VAPs that are co-hosted by the access point. As illustrated in FIG. 5, the HE operations parameters 500 relating to IEEE 802.11ax comprise 24 bits, B0 through B23. The parameter bits include a bit (B15) for Co-Hosted BSS, the bit being set if there is co-hosted BSS, such as with multiple VAPs that co-hosted by an AP. As it is required that co-hosted BSSs utilize a single color, a network device will thus recognize that, if multiple VAPs are present at an access point, each of the VAPs has a same BSS color.

In some embodiments, an apparatus, system, or process includes a dynamic BSS color feature, the feature allowing for each VAP of multiple VAPS co-hosted by an AP to have a different color. An algorithm for enabling or disabling the feature may include, for example, enabling or disabling the BSS color feature based at least in part on an SRG threshold as illustrated in FIG. 3, based at least in part on a BSS color collision count as illustrated in FIG. 4, or both.

In some embodiments, the enabling or disabling of the BSS color feature includes switching the Co-Hosted BSS bit (B15) in the HE operations parameters 500. Upon the algorithm enabling the BSS color algorithm, the B15 bit is switched to thus indicate that VAPs are not co-hosted BSSs, thus allowing network devices to view the VAPs as separate BSS entities having different BSS colors.

Figure 6:
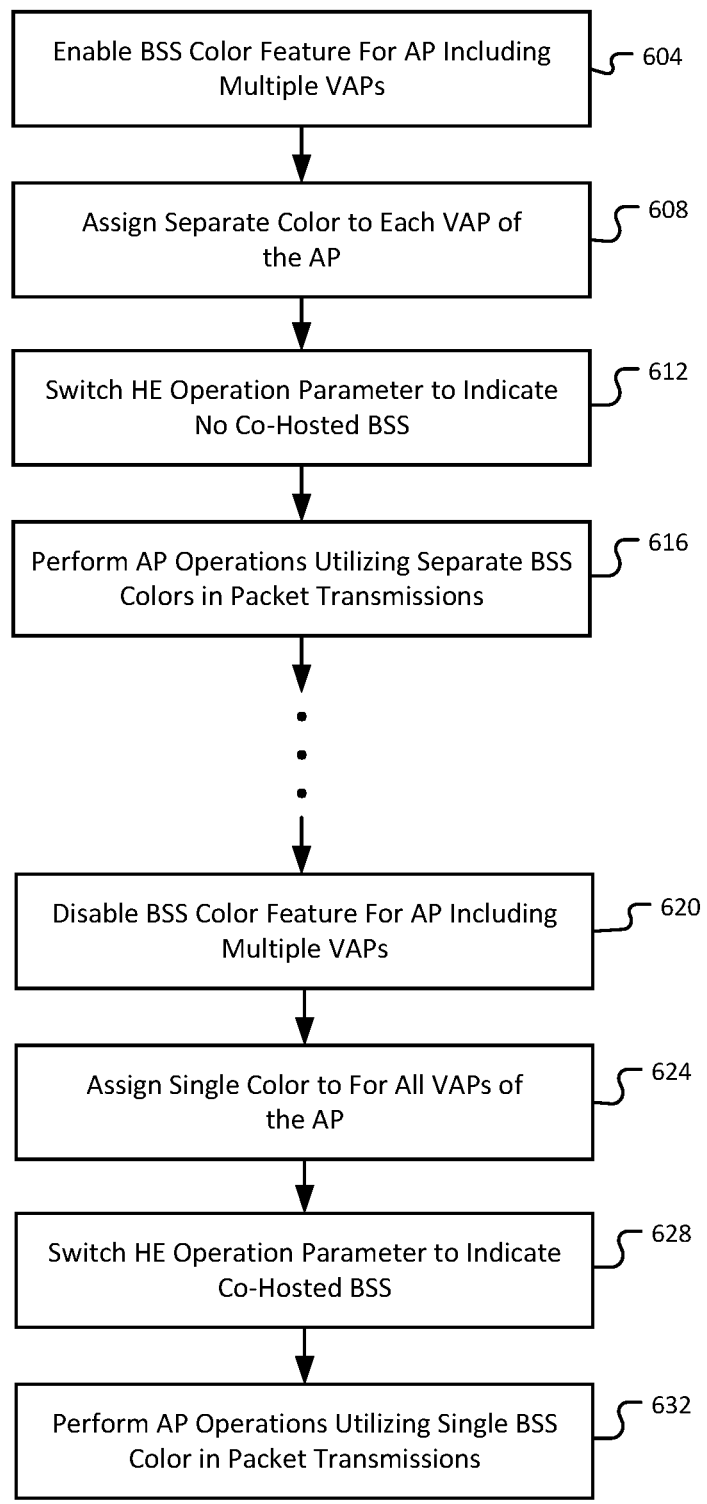
FIG. 6 is a flow chart to illustrate operations for enablement or disablement of a dynamic BSS color feature, according to some embodiments.

FIG. 6 is a flow chart to illustrate operations for enablement or disablement of a dynamic BSS color feature, according to some embodiments. In some embodiments, upon a access point enabling a BSS color feature 604, such as illustrated in FIGS. 1-5, the access point is to assign a different color to each VAP that is hosted by the access point 608. The assignment of BSS color may include any known processes for ensuring that available colors are chosen for an SRG and that such colors are appropriated distributed among the VAPs. The access point is further to switch the HE Operation Parameter that regards existence of a co-hosted BSS, shown as B15 in FIG. 5, to indicate that no co-hosted BSS is present 612. The access point is to then to perform AP operations utilizing the assigned different BSS colors in packet transmissions related to the VAPs of the AP.

In some embodiments, upon the access point disabling the BSS color feature 620, which may include disablement as illustrated in FIG. 3, FIG. 4, or both, the access point is to assign a single BSS color to all VAPs that are hosted by the access point 624. The access point is further to switch the HE Operation Parameter that regards existence of a co-hosted BSS to indicate that a co-hosted BSS is present 628. The access point is to then to perform AP operations utilizing the single BSS color in packet transmissions related to the VAPs of the AP 632.

Figure 7:
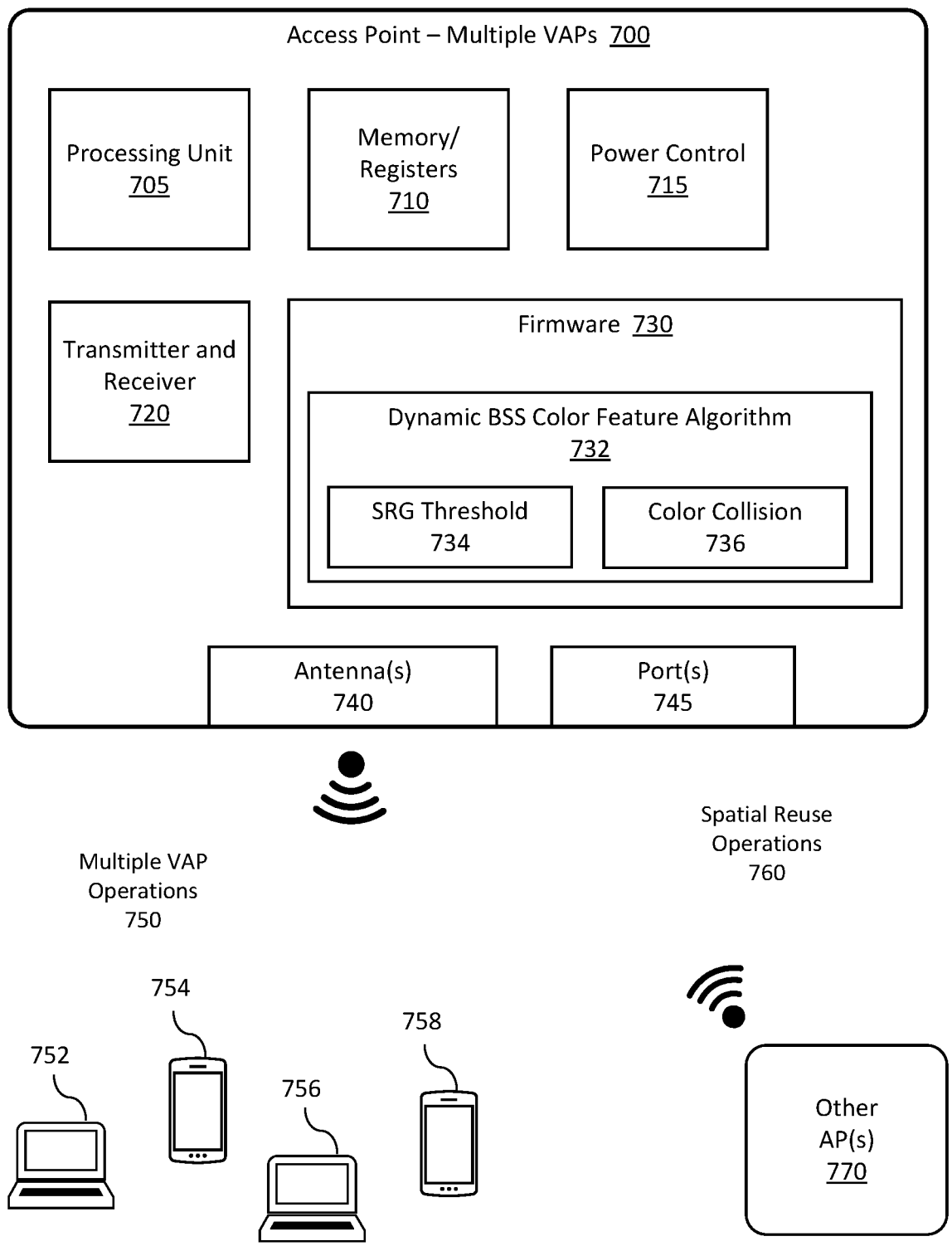
FIG. 7 is an illustration of an access point including a dynamic BSS color feature, according to some embodiments.

FIG. 7 is an illustration of an access point including a dynamic BSS color feature, according to some embodiments. In some embodiments, the access point 700 includes a processing unit 705, a transmitter and receiver 720, power control 715, one or more antennas 740 for wireless signal communication, and one or more ports 745 for network connections or other connections. The access point 700 may further include memory and registers 710 for storage of data, which may include volatile and nonvolatile memory (including flash memory and similar elements), registers, and other storage technologies. The memory and registers 710 include the HE operation parameters under IEEE 802.11ax as illustrated in FIG. 5. The access point 700 is to provide multiple VAP operations 750 for stations that are within the BSS of the access point 700, such as the illustrated client devices 752, 754, 756, and 758. Further, the access point 700 is to support spatial reuse operations 760 with one or more other access points 770.

In some embodiments, the access point 700 includes support for a dynamic BSS color feature, the feature allowing for assignment of different BSS colors for each VAP that is co-hosted by the access point 700. In some embodiments, the access point 700 further includes firmware 730 that includes a dynamic BSS color feature algorithm 732 to provide the BSS color feature. The algorithm 732 provides for enabling or disabling the BSS color feature, which may include either or both of elements to enable or disable the feature based on an SRG threshold 734, such as illustrated in FIG. 3, or to enable to disable the feature based on a color collision count 736, such as illustrated in FIG. 4.

In some embodiments, upon the algorithm 732 enabling the BSS color feature the access point 700 is to assign a different color to each VAP that is hosted by the access point, switch the HE Operation Parameter that regards existence of a co-hosted BSS to indicate that no co-hosted BSS is present, and perform AP operations utilizing the assigned different BSS colors in packet transmissions related to the VAPs of the AP. Upon the algorithm 732 disabling the BSS color feature, the assess point 700 is to assign a single BSS color to all VAPs that are hosted by the access point, switch the HE Operation Parameter that regards existence of a co-hosted BSS to indicate that a co-hosted BSS is present, and perform AP operations utilizing the single BSS color in packet transmissions related to the VAPs of the AP. The operations related to the enablement or disablement of the feature may be as illustrated in FIG. 6.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums have stored thereon executable computer program instructions that, when executed by one or more processors, cause the one or more processors to perform operations including enabling, by an access point, a dynamic basic service set (BSS) color feature for operation with a plurality of virtual access points (VAPs) hosted by the access point; switching a parameter of the access point to indicate that no co-hosted BSS is present; assigning a different BSS color to each of the plurality of VAPs; performing access point operations, including utilizing the assigned BSS colors for transmissions relating to any of the plurality of VAPs; and disabling the BSS color feature upon occurrence of one or more conditions.

In some embodiments, an access point includes a processor; a memory for storage of data; a transmitter and receiver to provide communication with one of more client devices in a basic service set (BSS), the access point to host a plurality of virtual access points (VAPs); and firmware including an algorithm for a dynamic BSS color feature, wherein the algorithm includes instructions to enable the BSS color feature for operation with the plurality of VAPs hosted by the access point; switch a parameter stored in the memory to indicate that no co-hosted BSS is present; assign a different BSS color to each of the plurality of VAPs; and disable the BSS color feature upon occurrence of one or more conditions.

In some embodiments, a method includes enabling, by an access point, a dynamic basic service set (BSS) color feature for operation with a plurality of virtual access points (VAPs) hosted by the access point; switching a parameter of the access point to indicate that no co-hosted BSS is present; assigning a different BSS color to each of the plurality of VAPs; performing access point operations, including utilizing the assigned BSS colors for transmissions relating to any of the plurality of VAPs; and disabling the BSS color feature upon occurrence of one or more conditions.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:

enabling, by an access point, a dynamic basic service set (BSS) color feature for operation with a plurality of virtual access points (VAPs) hosted by the access point;

when no co-hosted BSS is present, wherein a different BSS color is assigned to each of the plurality of VAPs; and disabling, by the access point, the BSS color feature such that the same BSS color is assigned to each of the plurality of VAPs when a threshold number of BSS colors for a spatial reuse group (SRG) to which one or more of the VAPs belong, or when a number of BSS color collisions reported by stations in the BSS exceeds a threshold number of collisions.

2. The one or more mediums of claim 1, further comprising executable computer program instructions that, when executed by the one or more processors, cause the one or more processors to perform operations comprising:

upon disabling the BSS color feature:
switching the parameter of the access point to indicate that a co-hosted BSS is present;
assigning a same BSS color for all of the plurality of VAPs; and
performing access point operations, including utilizing the assigned same BSS color for transmissions relating to any of the plurality of VAPs.

3. The one or more mediums of claim 1, further comprising executable computer program instructions that, when executed by the one or more processors, cause the one or more processors to perform operations comprising:
detecting, at the access point, an increase in power of or radar detection by a first peer access point, the first peer access point including a set of n VAPs, n being an integer equal to one or more; and
increasing the number of VAPs for access points in the SRG by n.

4. The one or more mediums of claim 3, further comprising executable computer program instructions that, when executed by the one or more processors, cause the one or more processors to perform operations comprising:
detecting, at the access point, a decrease in power of a second peer access point, the second peer access point including a set of m VAPs, m being an integer equal to one or more; and
decreasing the number of VAPs for access points in the SRG by m.

5. The one or more mediums of claim 4, further comprising executable computer program instructions that, when executed by the one or more processors, cause the one or more processors to perform operations comprising:
subsequent to disabling the BSS color feature, determining that the number of VAPs for access points in the SRG is less than or equal to the threshold number of BSS colors available for the SRG; and
re-enabling the BSS color feature.

6. The one or more mediums of claim 1, further comprising executable computer program instructions that, when executed by the one or more processors, cause the one or more processors to perform operations comprising:
detecting, at the access point, a report of a BSS color collision by a first station in a first VAP of the access point;
determining whether the first station can be moved to a different BSS with a different BSS color than a BSS color of the first VAP; and
upon determining that the station cannot be moved to another BSS having a different color, incrementing a collision count and comparing the collision count to the threshold number of collisions.

7. The one or more mediums of claim 6, further comprising executable computer program instructions that, when executed by the one or more processors, cause the one or more processors to perform operations comprising:
upon determining that the first station be moved to a second BSS, the second BSS having a different BSS color than the BSS color of the first VAP, moving the station to the second BSS.

8. The one or more mediums of claim 7, further comprising executable computer program instructions that, when executed by the one or more processors, cause the one or more processors to perform operations comprising:
periodically re-enabling the BSS color feature.

9. An access point comprising:
a processor;
a memory for storage of data;
a transmitter and receiver to provide communication with one of more client devices in a basic service set (BSS), the access point to host a plurality of virtual access points (VAPs); and
firmware including an algorithm for a dynamic BSS color feature, wherein the algorithm includes instructions to:
enable the BSS color feature for operation with the plurality of VAPs hosted by the access point when no co-hosted BSS is present,
wherein a different BSS color is assigned to each of the plurality of VAPs; and
disable the BSS color feature such that the same BSS color is assigned to each of the plurality of VAPs when a threshold number of BSS colors for a spatial reuse group (SRG) to which one or more of the VAPs belong, or when a number of BSS color collisions reported by stations in the BSS exceeds a threshold number of collisions.

10. The access point of claim 9, wherein the algorithm further includes instructions to:
upon disabling the BSS color feature:
switch a parameter to indicate that a co-hosted BSS is present.

11. The access point of claim 9, the algorithm further including instructions to:
subsequent to disabling the BSS color feature, determine that the number of VAPs for access points in the SRG is less than or equal to the threshold number of BSS colors available for the SRG; and re-enable the BSS color feature.

12. A method comprising:
assigning a different dynamic basic service set (BSS) color to each of a plurality of virtual access points (VAPs) hosted by the access point;
when no co-hosted BSS is present;
and
assigning the same BSS color to each of the plurality of VAPs when a threshold number of BSS colors for a spatial reuse group (SRG) to which one or more of the VAPs belong, or when a number of BSS color collisions reported by stations in the BSS exceeds a threshold number of collisions.

13. The method of claim 12, the method further including:
in response to determining that the number of VAPs for access points in the SRG is less than or equal to the threshold number of BSS colors available for the SRG; allowing for the assigning of different BSS colors to each of the plurality of VAPs.

14. The method of claim 12,
including: allowing for the assigning of different BSS colors to each of the plurality of VAPs when the number of BSS color collisions reported by stations in the BSS fails to exceed the threshold number of collisions.

* * * * *